United States Patent
Trusty et al.

(10) Patent No.: US 6,634,263 B2
(45) Date of Patent: Oct. 21, 2003

(54) UNIBODY LATHE SPINDLE LINER

(76) Inventors: Joel C. Trusty, 9653 Hampton Cir. South, Indianapolis, IN (US) 46256; Jon C. Trusty, Jr., 3072 S. Sycamore Hills, New Palestine, IN (US) 46163; Jeffrey F. Nawrot, 12143 Pearl Bay Ridge, Indianapolis, IN (US) 46236

( * ) Notice: Subject to any disclaimer, the term of this patent is extended or adjusted under 35 U.S.C. 154(b) by 0 days.

(21) Appl. No.: 09/843,217

(22) Filed: Apr. 26, 2001

(65) Prior Publication Data

US 2002/0029669 A1 Mar. 14, 2002

Related U.S. Application Data

(60) Provisional application No. 60/200,826, filed on Apr. 28, 2000.

(51) Int. Cl.$^7$ .............................. B23B 19/02
(52) U.S. Cl. ...................... 82/1.11; 82/126; 82/127
(58) Field of Search ................. 82/126, 127, 147, 82/124, 152, 903, 1.11

(56) References Cited

U.S. PATENT DOCUMENTS

| | | | |
|---|---|---|---|
| 4,058,036 A | | 11/1977 | Austin |
| 4,149,437 A | | 4/1979 | Winberg et al. |
| 4,526,072 A | * | 7/1985 | Manhoff, Jr. ............ 81/451 |
| 4,788,895 A | | 12/1988 | Spooner |
| 4,870,880 A | * | 10/1989 | Cantabery ............ 82/124 |
| 4,930,381 A | | 6/1990 | Spooner |
| 5,649,460 A | | 7/1997 | Berns et al. |
| 5,927,169 A | * | 7/1999 | Hinson ............ 82/127 |
| 6,227,084 B1 | * | 5/2001 | Cucchi ............ 82/126 |

OTHER PUBLICATIONS

Trusty–Cook Incorporated, "Compothane Hush Tubes," promotional piece, date unknown, USA.

* cited by examiner

*Primary Examiner*—Daniel W. Howell
(74) *Attorney, Agent, or Firm*—Daniel L. Boots; Bingham McHale, LLP

(57) ABSTRACT

The present invention provides a method and article involving a one-piece, unibody spindle liner having a tubular shape with an outside diameter and inside diameter that may be sized to fit virtually any spindle of a turning machine and to readily allow for the feeding therethrough of any size or shape of bar or tube stock. This invention provides that the axial centerline of the workpiece is maintained in concentric axial alignment with the working centerline of the turning machine to reduce wobble or "whip" of the stock during the machining process. The liner's inner bore and diameter is molded to match and allow for feeding of virtually any size and shape stock being turned, including but not limited to round, hex, square, and extruded. The inner bore is molded into the spindle liner along its entire length providing absolute support of the workpiece. The spindle liner also has a flanged mounting end to allow for the proper orientation and attachment to the spindle. This invention also provides a method of forming the one-piece spindle liner that allows for significantly shorter delivery or lead times than the current standard for conventional metal spindle liners. Once the spindle inside diameter(s) is established for a specific machine make, a mold can be created to establish the spindle liner outside diameter. The only variable that remains is the shape and size of the inside diameter of the throughbore of the spindle liner. The mold core determines the cross-section of the spindle liner and can be changed readily as needed. Once the machine tool spindle inner dimension is known and the mold is established, the lead time can be as short as the same day to within a couple of days from the receipt of the customer's order.

28 Claims, 5 Drawing Sheets

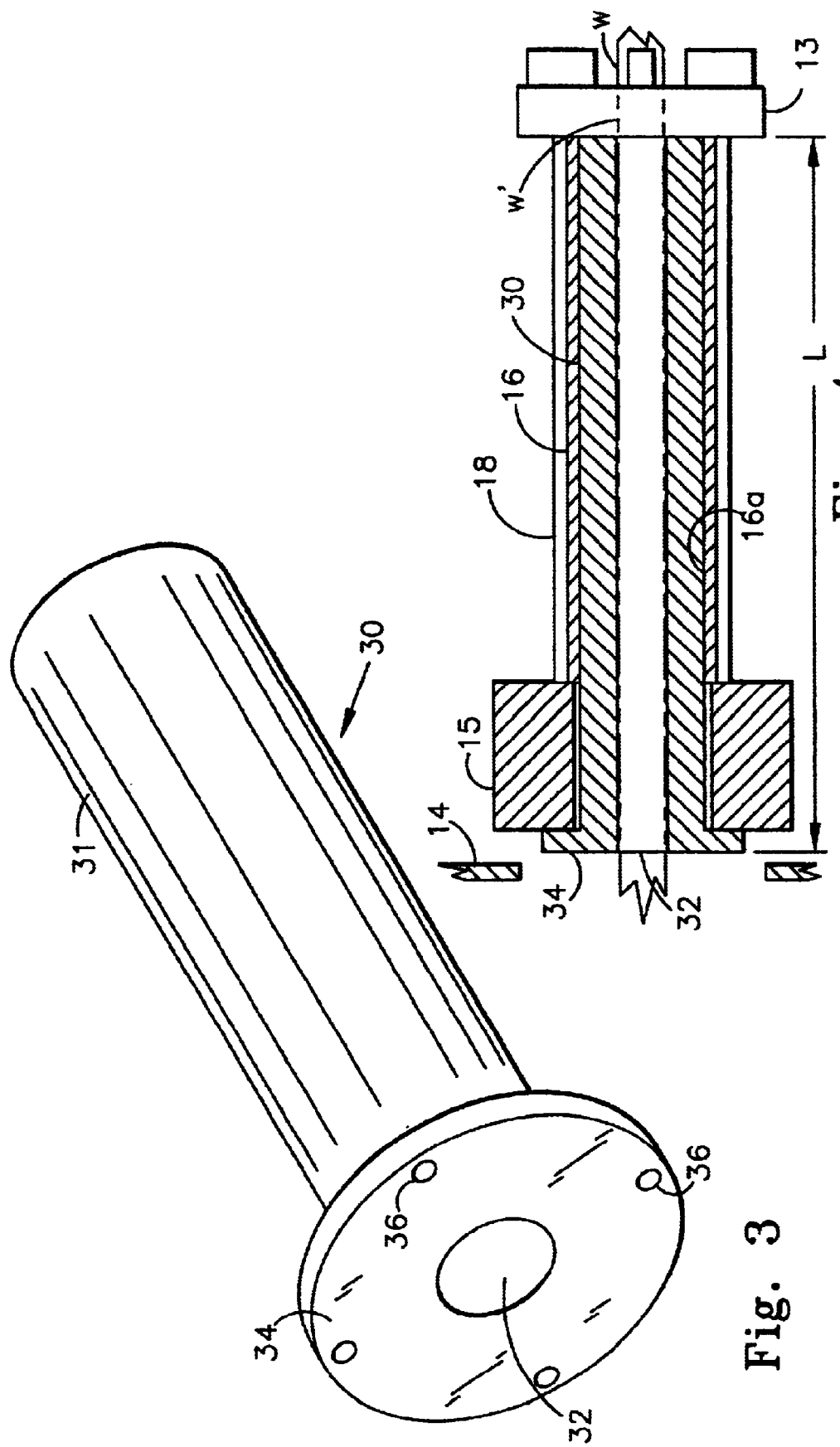

UNIBODY LATHE SPINDLE LINER

This application claims the benefit of Provisional Application No. 60/200,826, filed Apr. 28, 2000.

TECHNICAL FIELD

This invention relates to liners for securely holding a workpiece centered in a machine tool and, more particularly, to a unibody liner for securing a workpiece in the hollow spindle of a turning machine for effectively controlling bar whip and its related problems.

BACKGROUND ART

Virtually all metal turning machine tools involve the feeding of bar or tube stock, which is commonly longer than the finished part upon completion of the machining process. Typically, the stock or workpiece is fed through a tubular spindle in the head stock of the machine to a chuck mechanism where the cutting operation occurs. The workpiece is secured by a chuck mechanism during the machining process while the entire length of the workpiece rotates. This rotation is typically at a high rate of revolutions per minute. As a workpiece is finished, a new workpiece is continually fed by an automatic or manual bar pusher rod mechanism.

When stock smaller than the inside diameter of the spindle is fed through the spindle and is clamped by the chuck mechanism while the entire bar is spinning, the stock remaining inside the spindle will rotate out of concentric rotation (e.g., wobble). This condition, commonly referred to as "whip," results in undesirable machine noise, unacceptable machined part tolerances, poor machine finishes, and vibration or "chatter," which reduces the operator's ability to predict or control the machining operation. Such conditions adversely effect the cutting or quality of the operation, often resulting in stock loss.

To address this condition and to improve machine performance, particularly at higher revolution speeds, "liners" were developed to fit in the through-opening of the spindle of the turning machine. Such a liner has a tubular shape with an axial opening extending along its entirety. The workpiece then fits through the axial opening of the liner. The liner has an outer diameter equal to part of the inner diameter of the spindle and an inner diameter slightly greater than that of the outside diameter of the bar stock, in order to concentrically fill the annular space between the workpiece and the inner wall of the spindle. Typically, a cylindrical filler tube or spindle liner for each size of the bar stock was used.

One conventional approach for reducing stock whip in the spindle of a turning machine is a cylindrical reduction tube constructed from metal to form the inside diameter, with a series of annular bearing rings or O-rings to establish the outside diameter. The inside diameter of the reduction tube is typically slightly greater than the outside diameter of the stock for the purpose of concentrically filing or reducing the space between the stock and the spindle, that is, the outside diameter of the reduction tube or liner is roughly equal to the inside diameter of the spindle.

In the use of the aforementioned prior art liner, a particular liner is selected from a set of spindle liners depending on the workpiece to be machined. The liner is inserted into the lathe and secured by way of a mounting flange disposed adjacent to one end of the liner and a set of fasteners (i.e., bolts) securing the liner to the turning machine. When a different sized workpiece is to be machined, the liner must be unfastened and removed to allow the next liner to be positioned and secured within the spindle.

Other prior art liners include those developed by Austin, U.S. Pat. No. 4,058,036; Winberg et al., U.S. Pat. No. 4,149,437; Spooner, U.S. Pat. Nos. 4,788,895 and 4,930,381; and Berns et al., U.S. Pat. No. 5,649,460. All of the aforementioned prior art devices suffer from being complex in design and expensive to manufacture.

This conventional method of filling the void between stock and the spindle still experiences various problems. First, the metal material of the spindle inner may not allow for feeding of non-uniform or slightly bowed bar stock. Second, when running hex, square, or extruded shaped bar stock, the inner bore of the conventional spindle liner does not take the shape of this stock through its entire length. Utilizing machined pins or dowel rings, the bar stock is only held at few locations (typically 2 or 3) and, therefore, control of the bar as it is fed through the machine is not fully optimized. Third, the metal-to-metal contact between the work piece and the interior of the metal liner has a tendency to mar or scratch the workpiece. Fourth, the metal-to-metal contact in a conventional spindle liner does not fully minimize vibration and the subsequent noise and control problems. This problem can lead to the requirement of several metal spindle liners for multiple bar stock sizes in close size proximity, which becomes expensive. It also can lead to the operator's inability to fully control and optimize the productivity of the machine's cutting operation.

In addition, in some cases the weight of the conventional metal spindle liner adds a significant amount of weight to the spindle, increasing the amount of turning mass, which in turn results in additional wear on the machine and the spindle. A conventional metal liner is also corrosive and, over time, will leave amounts of dirt and grime within the interior of the spindle. This adds to cost of maintaining and operating the metal turning machine.

Other concerns include the conventional spindle liner being easily damaged when not in use if dropped or impacted with any moderate degree of force. Finally, the conventional spindle liner requires complex machining and manufacture, which adds to the expense and lead time of conventional liners.

DISCLOSURE OF INVENTION

The present invention, provides a method and article involving a one-piece, unibody spindle liner formed from urethane material and having a tubular shape with an outside diameter and inside diameter that may be sized to fit virtually any spindle and to readily allow for the feeding therethrough of any size or shape of bar or tube stock.

This invention particularly relates to hollow liners utilized in a wide number of today's machining operations for handling and feeding tubular or bar stock such that the axial centerline of the workpiece is maintained in concentric axial alignment with the working centerline of the turning machine. The liner of this invention may be configured as needed to accommodate workpieces of different sizes and shapes. Heretofore, it was commonly considered prohibitively expensive to provide multiple spindle liners for a large number of bar stock sizes and shapes. This invention eliminates that obstacle by providing a method of forming a one-piece liner that is considerably less expense than conventional liners, thereby enabling an operator of a turning machine to indeed have multiple liners on hand to accommodate the many varying sizes and shapes of bar or tube stock.

Through a molding process, the outside diameter of the unibody liner is sized to fit the dimensions of virtually any size spindle. The liner's inner bore and diameter is molded to match and allow for feeding of virtually any size and shape stock being turned, including but not limited to round, hex, square, and extruded. Furthermore, the inner bore is molded into the spindle liner along its entire length providing absolute support of the workpiece. The spindle liner has a flanged mounting end to allow for proper orientation and attachment to the spindle.

This invention also presents a method of forming a unibody liner for a lathe spindle, including providing a mold for forming the unibody liner having an axial core piece that defines the through-opening of the liner. The core is intended to closely match the dimension of the workpiece to be machined. The mold includes an upper cap having a fill hole and a center locator pin that, in conjunction with a central pin disposed at the opposite end of the mold, secures and maintains the core piece in concentric alignment with the central axis of the mold. The poured polyurethane typically sets up within 15–30 minutes, after which time the molded liner is removed from the mold and placed in an oven for approximately 8–10 hours at 150 degrees F to complete the curing process. Thus, once the operator receives an order for a liner of specific dimensions, the liner mold may be configured to match the outer diameter and through-opening specifications, the urethane material poured in its liquid or molten state into the mold, the cured liner may then, after about 15–30 minutes, be removed from the mold, baked in a curing oven for about 8–10 hours, and then shipped to the customer, all within a single working day if necessary.

Such a one-piece, unibody liner provides many advantages over conventional metal spindle liners. The liner of this invention is considerably lighter in weight than metal liners. The reduced weight translates into less rotating mass within the spindle, thus lowering wear on the spindle and the turning machine. Another advantage is that the inner bore of the spindle liner of this invention can be molded to the shape and size of any stock being fed through the spindle. The bore for non-round stock is molded into the entire liner as opposed to just a few locations in the conventional metal liners. This allows for optimal control of bar whip and its associated problems.

In the conventional liner, a non-round work piece is not held or secured at all points along the entire length of the liner; it is held at only 2 or 3 locations along its length by pins or dowel rings. Consequently, as the non-round workpiece is being indexed, i.e., pushed/pulled, through the spindle during the cutting process, there's a greater chance that the workpiece will rotate out of concentric center, thereby producing whip.

Furthermore, the spindle liner consists of, preferably, polyurethane material which has significantly higher vibration dampening or reduction properties than the metal material in conventional spindle liners. The liner provides the ability to hold proper part tolerances, thereby reducing scrap rates and increasing productivity. The bar stock is also protected from marring or scratching by the liner. The liner also reduces the wear on machine cutting tools due to the vibration deadening properties of the material from which it is constructed. Noise is also considerably reduced by the use of this novel liner. The machining operation is also able to be operated at a faster turning speed, while maintaining optimal machine control, thereby leading to improved productivity.

Multiple sizes or slightly bowed bar stock may be run in the same spindle liner because of the mechanical integrity and properties of the polyurethane material. The one-piece polyurethane spindle liner is also more durable and virtually indestructible as compared to the conventional metal spindle liner. It is also non-corrosive. Finally, the one-piece liner cost considerably less (upward to 50% less) to manufacture then the current industry standard metal liner.

This invention also provides a method of forming the one-piece polyurethane spindle liner that allows for significantly shorter delivery or lead times than the current industry standard for conventional metal spindle liners. Once the spindle inside diameter(s) is established for a specific machine make, a mold can be created to establish the spindle liner outside diameter. The only variable that remains is the shape and size of the inside diameter of the throughbore of the spindle liner. The mold core determines the cross-section of the spindle liner and can easily be changed as needed. Once the machine tool spindle inner dimension is known and the mold is established, the lead time can be as short as the same day to within a couple of days from the receipt of the order.

To overcome the above problems and shortcomings of the prior art, it is an object of the present indication to provide a bar stock support to minimize whipping and other undesirable radial or lateral motion of the bar stock while in the spindle during machining. Another object is to provide an inexpensive spindle liner that is simple to manufacture, thereby enabling an operator to have one or more of the liners of this invention readily on hand to accommodate workpieces of varying diameter and cross-sectional shapes.

Other objects, advantages and novel features of the invention will become apparent from the following detailed description of the invention when considered in conjunction with the accompanying drawings.

BRIEF DESCRIPTION OF DRAWINGS

The foregoing and other features of the invention will be more particularly described in connection with the preferred embodiment and with reference to the accompanying drawings wherein:

FIG. 3 is a perspective view of the preferred spindle liner of this invention;

FIG. 4 is a sectional fragmenting side view of a lathe with the spindle liner of FIG. 3;

BEST MODE FOR CARRYING OUT THE INVENTION

Figure 1:
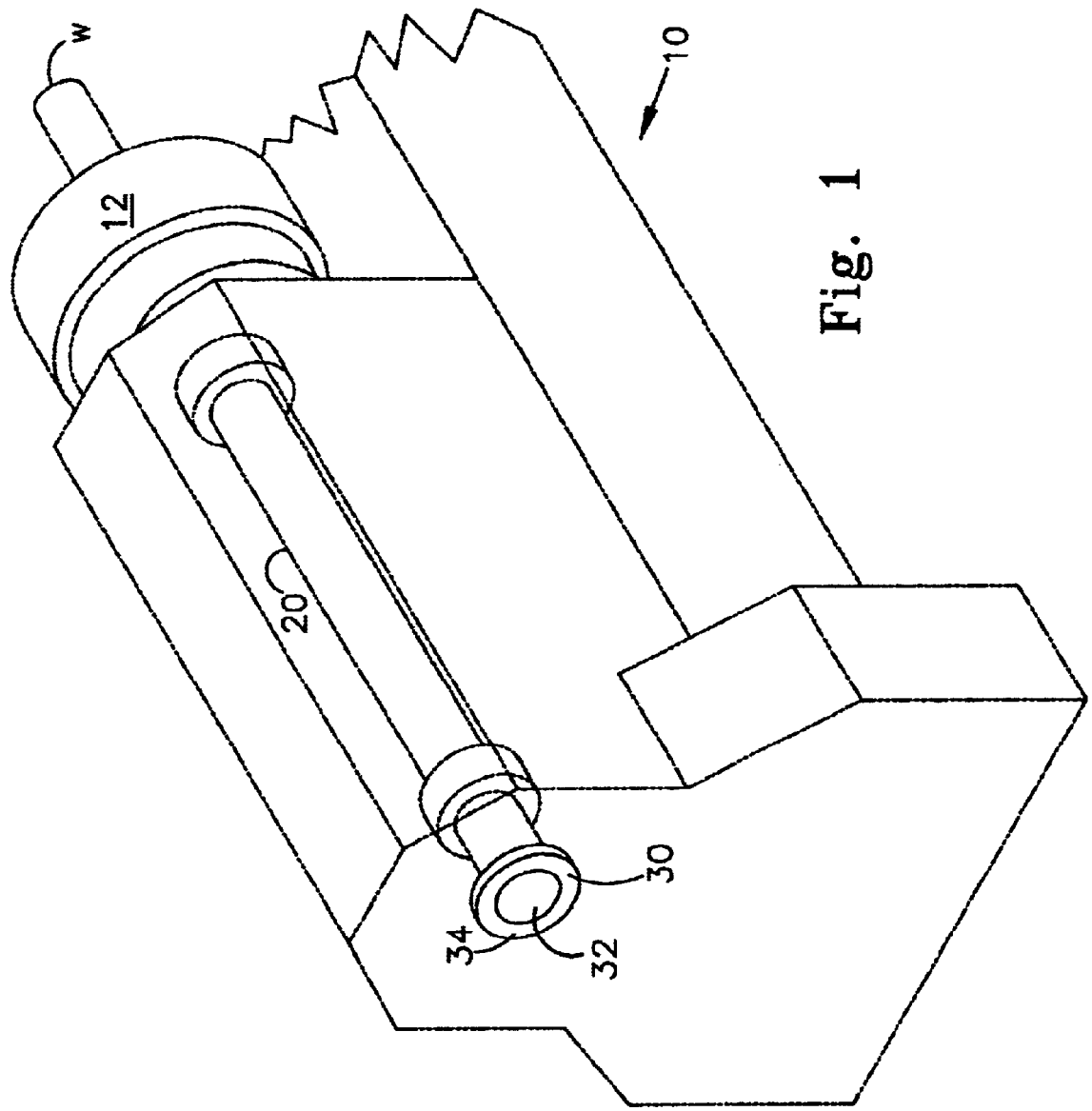
FIG. 1 is an environmental view in phantom perspective of a conventional turning machine such as a lathe equipped with the spindle liner of this invention.

Referring now to the drawings wherein like reference numerals designate identical or corresponding parts or elements throughout the several views, FIG. 1 shows in phantom lines a conventional turning machine such as a lathe 10 comprising a head stock 12 including a chuck (not shown) and a spindle 20. Not shown is FIG. 1 but typically present in conjunction with lathe 10 is a track-mounted cutting tool for movement into working engagement with a workpiece W. The workpiece is commonly held by the chuck so that a portion to be worked upon extends beyond the jaws of the chuck and is in a position to be machined by the cutting tool. The spindle liner 30 of the invention is shown positioned within the following spindle of the machine 10.

Figure 2:
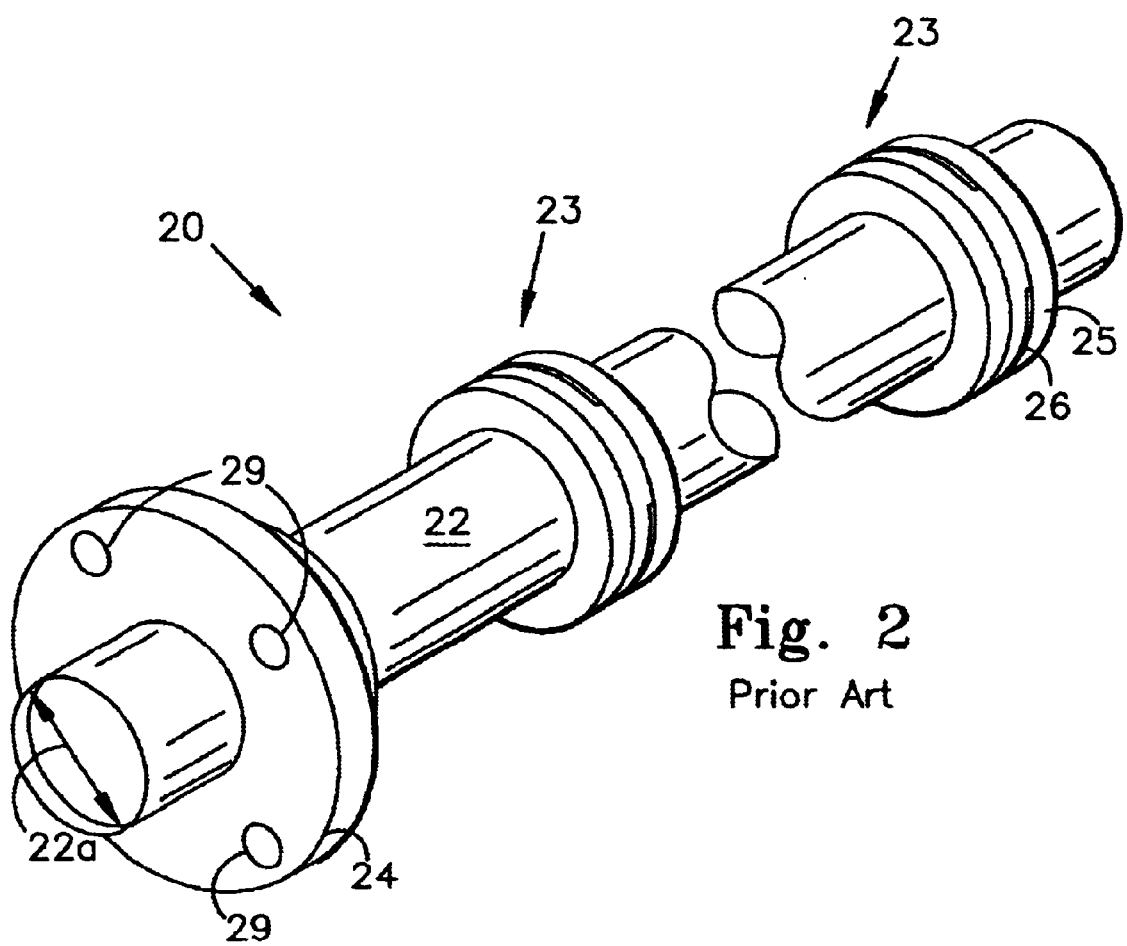
FIG. 2 is a perspective view of a prior art spindle liner.

In FIG. 2, a prior art spindle liner 20 widely used in industry today is shown. Liner 20 has a tubular sleeve 22, bearing rings 23 and an annular mounting flange 24. While the tubular sleeve has a length dependent on the lathe in which it is to be used, about two feet to about five feet in length is typical. The inside diameter 22a of the liner is dependent on the workpiece it is to accommodate. As known in the industry, a set of spindle liners of varying sleeve diameters is generally needed to accommodate the many workpieces of varying sizes and cross sections. Each sleeve's inside diameter is ideally slightly larger than the diameter or maximum cross-dimension of the workpiece so as to slidably receive the workpiece with a minimum of play. While stock workpiece diameters vary widely, a diameter of from above one-fourth inches to about six inches is commonly used, though smaller and larger diameter workpieces are also available. The tubular sleeve 22 of the spindle liner 20 is dimensioned to accommodate virtually any sized workpiece that the lathe is built to handle.

The bearing rings 23 comprise an annular member 25 permanently secured to the outside surface of the tubular sleeve 22 and a resilient O-ring 26 disposed in a groove extending around annular member 25. Their purpose is to bear against the inside wall of the hollow spindle to stabilize the spindle liner and its associated workpiece during the cutting operation. Accordingly, the outside diameter of the bearing rings is dimensioned to allow the spindle liner to slide into the hollow spindle of the lathe with a minimum of play. Inasmuch as each lathe is dimensioned differently, each bearing ring on the spindle liner is specially dimensioned for that particular lathe. The bearing rings are substantially uniformly spaced along the tubular sleeve 22 of the liner in accord with requirements well known to those in the industry. Liner 20 is releasably secured to the spindle of the turning machine by way of a plurality of bolt holes 29. Such a conventional liner is burdened with the aforementioned disadvantages.

The spindle liner 30 of this invention is better shown in FIGS. 3 and 4 comprising an elongated, one-piece tubular sleeve member 31 having an axial central opening 32 extending entirely the length of the liner 30, and amounting flange 34 for securing the liner at the spindle terminus opposite the stock end of the turning machine 10 where the chuck 13 is located. Flange 34 is circular-shaped and includes one or more bolt holes 36 (not shown in FIG. 4) to secure the liner near the back 14 of the turning machine.

As shown more clearly in FIG. 4, the spindle liner 30 of this invention substantially fills the void between the outer surface W of the workpiece W (shown in phantom in FIG. 4) and the interior surface of the spindle 16. The spindle 16 fits within a draw tube 18 that is part of a conventional cutting machine. In a preferred embodiment, the longitudinal dimension "L" to fit most CNC cutting machines in use today is typically 24 inches to 60 inches; however, the length of the liner is not limited.

Figure 5:
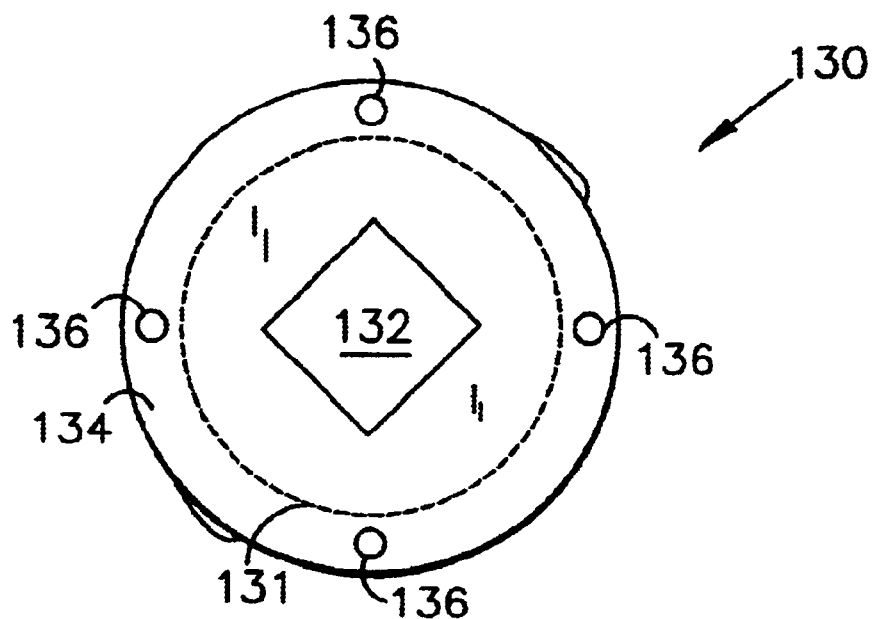
FIG. 5 is an end view of an alternative embodiment of the liner provided by the invention.

As noted, the liner of this invention may be readily formed to accommodate workpieces of varying cross sections. An end view of such an alternative embodiment of a spindle liner 130 of this invention is shown in FIG. 5 having a mounting flange 134 with one or more through holes 136 for securing the liner 130 to the spindle. The central axial opening 132 of spindle liner 130 is configured to accommodate square bar or tube stock and maintain the stock's orientation to the chuck. The outer dimension of the flange 134 can be from about 3 inches to about 6 inches, but can be any size as desired. In one example, the outer dimension of flange 134 is approximately 4.25 inches, and the outer cross-dimension of the tube sleeve portion 131 is approximately 2.56 inches. In use, the dimension of opening 32 or 132 can be a variety of sizes and cross sections as determined by the specifications of the workpiece being turned by the customer.

Figure 7:
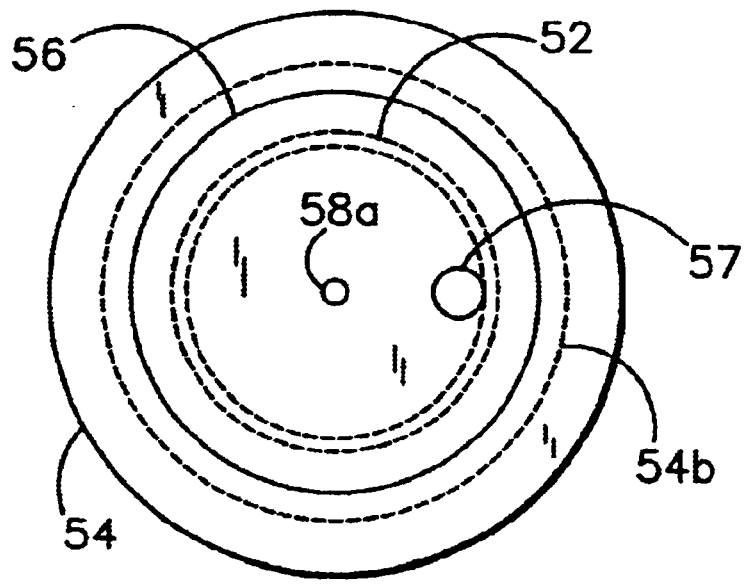
FIG. 7 is top view of the spindle liner mold of FIG. 6.
Figure 6:
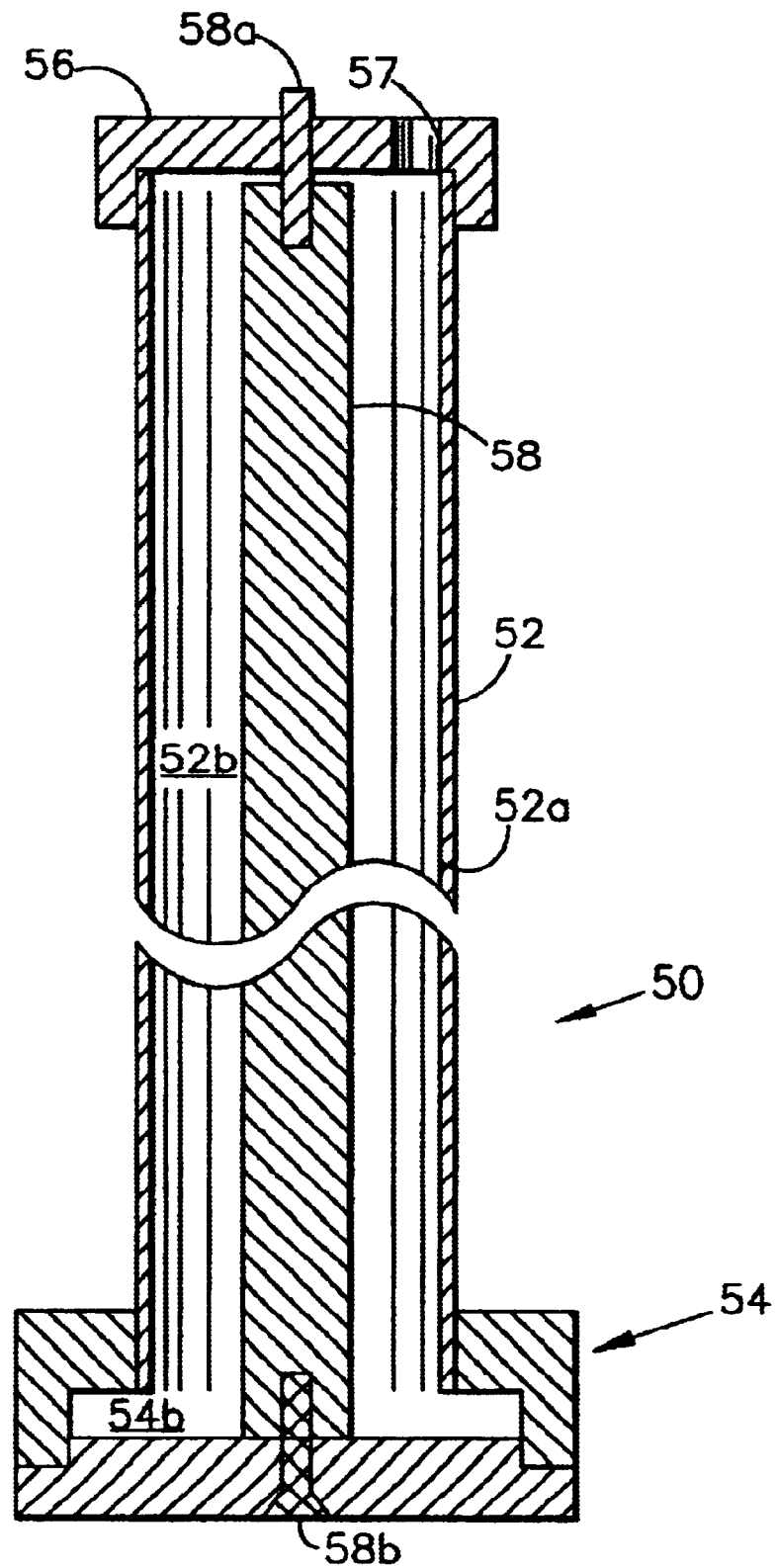
FIG. 6 is a cross-sectional view of a preferred mold for forming the liner of this invention.

A preferred mold for forming a spindle liner of this invention is shown in FIGS. 6 and 7, comprising a hollow mold 50 including an elongated tubular potion 52 having a mounting-flange forming portion 54 at one end and an end cap 56 at the opposing end. Mold 50 may be constructed of conventional mold-forming materials (i.e., stainless steel) via conventional methods. Extending and secured concentrically within the interior length of the mold is a core element 58 that defines the dimension of the axial through-opening of the spindle liner. For example, to form the spindle liner shown in FIG. 5, the core element 58 would have a generally square cross-section of approximately 1 in. square. Core element 58 is maintained in proper concentric orientation within the mold by a pair of threaded pins 58a and 58b disposed at the opposite ends of core 58. Again, the through-opening of the liner of this invention can be easily varied by simply changing the core element to one matching the desired specifications to accommodate the subject workpiece.

The interior surface 52a of the tubular section 52 of the mold defines the outer circumferential surface of the liner once formed, which is slightly less than the interior diameter of the spindle for which the liner is being made in order for the liner to be received within the spindle with minimal play. The annular cross-section of the tubular portion 31 of the spindle liner is formed within the void area 52b of mold 50. The mounting flange 34 of the spindle liner of this invention is formed within the void area 54b of the mold.

The method provided by this invention includes the steps of determining the outer dimension of the subject workpiece, whether it be hex, square or round bar or extended stock; determining the inner diameter of the spindle of the turning machine upon which the subject workpiece will be machined; selecting an appropriate core element approximately the dimensions of the subject workpiece; selecting an appropriate tubular mold section having an inner diameter slightly less than the inner diameter of the spindle, which in turn will approximate the outer diameter of the liner once formed; selecting an appropriate flange-forming mold portion providing a mounting flange of the appropriate dimensions to be mounted upon the back end of the turning machine; selecting an appropriate top or end cap to fit the selected tubular mold portion; assembling the flange-forming mold portion to the tubular mold position; securing the central core element interiorly of the tubular mold portion by placing the top cap atop the open end of the tubular mold portion and securing the upper end of the core element by way of a fixing pin; introducing liquid polyurethane in a molter state into the interior of the mold so formed through a fill hole provided in the top cap until the interior void of the mold is substantially filled; and allowing the molded liner to set up for an appropriate length of time to permit the polyurethane to cure to a sufficient state.

The preferred material for constructing the spindle liner of this invention is polyurethane. It should be understood, however, the any plastic material that may be poured into a mold and that cures and hardens in a relatively short time may be suitable.

Although the present invention has been described with a preferred embodiment, it is to be understood that variations and modifications may be made without departing from the scope of this invention as set forth in the following claims. Such variations and modification are considered to be within the purview and scope of the appended claims.

We claim:

1. A liner for supporting a workpiece concentric within a hollow spindle of a turning machine, comprising:

an elongated sleeve member having a central through-opening extending along its entire length, said though-opening being formed for mating with said workpiece such that said through-opening can slidably receive said workpiece, for slidably receiving therein said workpiece, the outer diameter of said liner being slightly smaller than the inner diameter of the spindle such that the liner is slidably received within the spindle, said through-opening being concentric with the hollow spindle and having a cross-dimension slightly greater than the outer cross-dimension of the workpiece such that the workpiece is slidably received within said through-opening, said liner being of a unitary construction and contacting said workpiece substantially along its length within the liner to minimize out-of-concentric rotation of the workpiece during the machining process.

2. The unitary liner of claim 1 further comprising a flange disposed at one end of said liner for securing said liner at the spindle terminus opposite the chuck end of the turning machine.

3. The unitary liner of claim 2 wherein said flange includes one or more openings extending therethrough for receiving fasteners for securing said liner to the spindle terminus.

4. The unitary liner of claim 3 wherein said fastener openings extending through said flange generally parallel with the central axis of said liner.

5. The unitary liner of claim 1 wherein said central through-opening has a circular cross-section.

6. The unitary liner of claim 1 wherein said central through-opening has a square cross-section.

7. The unitary liner of claim 1 wherein said central through-opening has a hexagonal cross-section.

8. The unitary liner of claim 1 wherein said central through-opening has an octagonal cross-section.

9. A liner for a hollow spindle of a turning machine, comprising:

an elongated tubular member having a central through-opening extending along its entire length and concentric with the spindle, said liner having an outer diameter slightly smaller than the interior diameter of the spindle to provide minimal play between the liner and the spindle, said central through-opening of said liner having an outer diameter or maximum cross-dimension slightly greater than the outer diameter of a tubular workpiece or the maximum cross-dimension of square, hexagonal or octagonal workpiece, so as to slidably receive the bar stock within the central through-opening with minimal play between the workpiece and the liner substantially along the length of the liner, and a flanged shoulder portion arranged at one end of said liner for securing said liner to the terminus end of the spindle, said liner being of unitary construction and contacting said bar stock substantially along its length within the liner to minimize wobble of the workpiece during the machining process.

10. The unitary liner of claim 9 wherein said central through-opening has a circular cross-section.

11. The unitary liner of claim 9 wherein said central through-opening has a square cross-section.

12. The unitary liner of claim 9 wherein said central through-opening has a hexagonal cross-section.

13. The unitary liner of claim 9 wherein said central through-opening has an octagonal cross-section.

14. The unitary liner of claim 9 wherein said liner is constructed from a plastic material.

15. The unitary liner of claim 14 wherein said plastic material is polyurethane.

16. A method of minimizing out-of-concentric rotation of a workpiece within a hollow spindle of a turning machine during a machining process, said method comprising the steps of:

a. providing a workpiece, said workpiece being defined by a piece of tubular or bar stock;

b. providing a unibody, elongated tubular member having a central though-opening extending along its entire length and concentric with the spindle, said liner having an outer diameter slightly smaller than the interior diameter of the spindle to provide minimal play between the liner and the spindle, said central through-opening of said liner being formed for mating with said workpiece, so as to slidably receive the workpiece within the central though-opening with minimal play between the workpiece and the liner, and a flanged shoulder portion arranged at one end thereof for securing said liner to the terminus end of the spindle, said liner being of a unitary construction;

c. placing aid liner within the hollow spindle of said turning machine and securing the flange of said liner to the terminus end of the spindle; and d. slidably placing the workpiece through the central through-opening of said liner such that the distal end of the workpiece extends beyond the distal end of said liner such that the distal end of the workpiece may be machined and contacting the workpiece substantially along its length within the liner to minimize wobble of the workpiece during the machining process.

17. A method of protecting a workpiece from damage within a hollow spindle of a turning machine during a machining process, said method comprising the steps of:

a. providing a workpiece, said workpiece being defined by a piece of tubular or bar metal stock;

b. providing a generally elongated tubular member having a central through-opening extending along its entire length, said member having an outer diameter smaller than the interior diameter of the spindle to provide minimal play between the member and the spindle, said central through-opening of said member being formed for mating with said workpiece, so as to slidably receive the workpiece within the central through-opening with minimal play between the workpiece and the member, the cross-sectional shapes of the central though-opening and of the workpiece being immaterial so long as the workpiece is receivable within the central through-opening of said member, and a flanged shoulder portion arranged at one end thereof for securing said liner to the terminus end of the spindle, said spindle member being constructed of plastic material;

c. placing said member within the hollow spindle of said turning machine and securing the flange of said liner to the terminus end of the spindle; and d. slidably placing the workpiece through the central through-opening of said member such that the distal end of the workpiece extends beyond the distal end of said member such that the distal end of the workpiece may be machined, and contacting the workpiece substantially along its length within the member to prevent the workpiece from contacting the interior wall of the spindle during the machining process.

18. A liner for supporting a workpiece within a hollow spindle of a turning machine, comprising:

a tubular member having a central through-opening extending axially along its entire length for receiving therein said workpiece, the outer diameter of said liner being smaller than the inner diameter of the spindle such that the liner is receivable within the spindle, said central through-opening being concentric with the hollow spindle and having a cross-dimension greater than the outer cross-dimension of the workpiece such that the workpiece is receivable within said central through-opening, said liner contacting and supporting said workpiece along its entire length.

19. The liner of claim 18 wherein the interior diameter of the central trough-opening of said liner, regardless of the cross-sectional shape of said through-opening, is greater than the maximum cross-dimension of the workpiece, regardless of the cross-sectional shape of said workpiece.

20. The liner of claim 18 wherein the cross-sectional shape of the central through-opening of said liner is equivalent to or substantially similar to the cross-sectional shape of said workpiece.

21. The liner of claim 18 wherein said spindle and said workpiece are constructed from metal, said liner is constructed from a plastic material, and said liner, being disposed between the workpiece and the interior wall of the spindle, protects the workpiece from damage by preventing metal-to-metal contact of the workpiece and the interior wall of said spindle.

22. The liner of claim 18 further comprising a flange disposed at one end of said liner for securing said liner at the spindle terminus opposite the chuck end of the turning machine.

23. The liner of claim 18 wherein said central through-opening has a circular cross-section.

24. The liner of claim 18 wherein said central through-opening has a square cross-section.

25. The liner of claim 18 wherein said central through-opening has a hexagonal cross-section.

26. The liner of claim 18 wherein said central through-opening has an octagonal cross-section.

27. The liner of claim 18 wherein said liner is constructed from a plastic material.

28. The unitary liner of claim 27 wherein said plastic material is polyurethane.

* * * * *